(12) United States Patent
Dominiak et al.

(10) Patent No.: US 11,117,821 B2
(45) Date of Patent: Sep. 14, 2021

(54) MULTI-PARAMETER ENHANCEMENT OF MEMBRANE BIOREACTOR PROCESS EFFICIENCY BY BIOMASS SELECTION AND SELECTIVE BIOMASS WASTING

(71) Applicant: Grundfos Holding A/S, Bjerringbro (DK)

(72) Inventors: Dominik Marek Dominiak, Lodz (PL); Tom Jæger, Aalborg (DK)

(73) Assignee: Grundfos Holding A/S, Bjerringbro (DK)

( * ) Notice: Subject to any disclaimer, the term of this patent is extended or adjusted under 35 U.S.C. 154(b) by 128 days.

(21) Appl. No.: 16/462,781

(22) PCT Filed: Nov. 28, 2017

(86) PCT No.: PCT/DK2017/050396
§ 371 (c)(1),
(2) Date: May 21, 2019

(87) PCT Pub. No.: WO2018/103802
PCT Pub. Date: Jun. 14, 2018

(65) Prior Publication Data
US 2019/0367398 A1   Dec. 5, 2019

(30) Foreign Application Priority Data
Dec. 6, 2016   (DK) .................. PA 2016 70966

(51) Int. Cl.
*C02F 9/00*       (2006.01)
*C02F 11/121*     (2019.01)
(Continued)

(52) U.S. Cl.
CPC .............. *C02F 9/00* (2013.01); *C02F 11/121* (2013.01); *C02F 11/123* (2013.01);
(Continued)

(58) Field of Classification Search
CPC .......... C02F 1/004; C02F 1/385; C02F 1/444; C02F 1/001; C02F 3/1221; C02F 3/1268;
(Continued)

(56) References Cited

U.S. PATENT DOCUMENTS

2008/0217244 A1   9/2008   Gaid
2010/0140167 A1*  6/2010   Sun ...................... C02F 3/1221
                                                              210/605

(Continued)

FOREIGN PATENT DOCUMENTS

EP   0 267 328 A1   5/1988
EP   3 040 315 A1   7/2016
(Continued)

OTHER PUBLICATIONS

International Search Report for PCT/DK2017/050396 dated Jan. 22, 2018.

*Primary Examiner* — Nam X Nguyen
*Assistant Examiner* — Julia L. Wun
(74) *Attorney, Agent, or Firm* — Knobbe Martens Olson & Bear LLP

(57) ABSTRACT

The present invention relates to a process and device for selectively removal of deflocculated sludge below a pre-selected size from a sludge mixed liquor. The invention resides in the concept of removing from the sludge mixed liquor deflocculated sludge. The removal is preferably carried out by a two-step separation providing a fraction comprising sludge flocs, substantially freed from deflocculated sludge, and a fraction containing mostly deflocculated sludge. The fraction comprising sludge flocs is returned into the sludge mixed liquor, while the fraction containing mostly deflocculated sludge is removed from the system.

25 Claims, 2 Drawing Sheets

(51) Int. Cl.
  *C02F 11/123* (2019.01)
  *C02F 11/127* (2019.01)
  *C02F 1/00* (2006.01)
  *C02F 1/38* (2006.01)
  *C02F 3/12* (2006.01)
  *C02F 3/20* (2006.01)
  *C02F 11/12* (2019.01)
  *C02F 1/44* (2006.01)

(52) U.S. Cl.
  CPC ............ *C02F 11/127* (2013.01); *C02F 1/004* (2013.01); *C02F 1/385* (2013.01); *C02F 1/444* (2013.01); *C02F 3/1221* (2013.01); *C02F 3/1268* (2013.01); *C02F 3/20* (2013.01); *C02F 11/12* (2013.01); *C02F 2001/007* (2013.01); *C02F 2301/043* (2013.01); *C02F 2303/20* (2013.01)

(58) Field of Classification Search
  CPC ........ C02F 3/20; C02F 11/123; C02F 11/127; C02F 11/121; C02F 11/12; C02F 9/00; C02F 2301/043; C02F 2001/007; C02F 2303/20; C02F 2203/004; C02F 2209/105; Y02W 10/10
  USPC ........ 210/607, 767, 787, 790, 800, 805–808
  See application file for complete search history.

(56) References Cited

U.S. PATENT DOCUMENTS

| | | |
|---|---|---|
| 2014/0061126 A1* | 3/2014 | Dominiak .......... B01D 29/0075 210/609 |
| 2014/0083936 A1 | 3/2014 | Murthy et al. |
| 2014/0144836 A1 | 3/2014 | Nyhuis et al. |
| 2015/0048024 A1 | 2/2015 | Grélot et al. |

FOREIGN PATENT DOCUMENTS

| | | |
|---|---|---|
| JP | 2008-264650 A | 11/2008 |
| JP | 2015-58401 A | 3/2015 |

\* cited by examiner

MULTI-PARAMETER ENHANCEMENT OF MEMBRANE BIOREACTOR PROCESS EFFICIENCY BY BIOMASS SELECTION AND SELECTIVE BIOMASS WASTING

CROSS REFERENCE TO RELATED APPLICATIONS

This application is a U.S. National Phase Application of PCT International Application Number PCT/DK2017/050396, filed on Nov. 28, 2017, designating the United States of America and published in the English language, which is an International Application of and claims the benefit of priority to Danish Patent Application No. PA 2016 70966, filed on Dec. 6, 2016, The disclosures of the above-referenced applications are hereby expressly incorporated by reference in their entireties.

FIELD OF THE INVENTION

The present invention relates to a process and device for selectively removal of deflocculated sludge below a preselected size from a sludge mixed liquor. The invention resides in the concept of removing from the sludge mixed liquor deflocculated sludge. The removal is preferably carried out by a two-step separation providing a fraction comprising sludge flocs, substantially freed from deflocculated sludge, and a fraction containing mostly deflocculated sludge. The fraction comprising sludge flocs is returned into the sludge mixed liquor, while the fraction containing mostly deflocculated sludge is removed from the system.

BACKGROUND OF THE INVENTION

Membrane bioreactors (MBR) for wastewater treatment offer many process advantages, such as improved effluent quality and decoupling of hydraulic retention time from sludge age. However, the very presence of the membrane and its perfect retention of fine particles creates certain difficulties, most important of which include severely worsened sludge filterability, more difficult sludge dewatering, high fraction of inactive biomass (deflocculated flocs), and lowered oxygen transfer. These difficulties stand behind the higher operating cost of MBR compared with many traditional technologies.

Membrane bioreactors are nowadays regarded as the best available technology for industrial wastewater treatment and are consistently gaining this status in municipal applications. They offer many advantages over the conventional activated sludge process originating from the fact that biomass is retained by a microporous membrane. Some of them are the improved effluent quality and accelerated process rates. However, since the early days of MBR, membrane fouling has been the most significant drawback of this technology and the dominating subject of research in this area.

Activated sludge (or sludge mixed liquor), the heart of the MBR process, is a complex mixture of flocs, smaller cell aggregates, and both organic and inorganic particles suspended in water. The general structure of a floc is a result of the selective pressure in the wastewater treatment plant, favouring dense aggregates. Floc size is a net result of the floc strength and the mechanical stresses that the floc is subjected to, and it is a very dynamic characteristic with many implications on sludge macroscopic properties and sludge behaviour in large-scale processes.

Maintaining the hydraulic function of an MBR membrane is almost exclusively realized by applying shear to its surface, which is designed to remove foulants and facilitate filtrate flow. However, shear forces have a strong effect on biology of activated sludge, and a proper understanding of their action should advantageous be included in the reactor design and operation in order to avoid phenomena detrimental to membrane performance.

One of the most important consequences of introducing a membrane into an activated sludge reactor is the complete retention of small particles, like single cells and defloccu-lated material, which would be washed away from a conventional wastewater treatment plant along with the effluent. This effect shifts the particle size distribution of mixed liquor to lower values.

Treatments designed to retain membrane permeability, i.e. coarse bubble aeration in case of submerged MBR configuration and high-velocity sludge pumping in case of side-stream MBR configuration, further contribute to lowering the mean particle size and broadening the particle size distribution, leading to the fact that activated sludge flocs found in membrane bioreactors are much smaller than those from conventional plants. Small particles form more compact filtration cakes of lower porosity and smaller inter-particle voids, which create more resistance to liquid flow. Moreover, presence of single cells and very small cell aggregates may lead to membrane pore blocking, which eventually may result in irreversible membrane biofouling. Deflocculation, a process of floc disruption into smaller fragments and erosion of small particles from floc surface is especially damaging to filtration performance due to the effect known as cake blinding, consisting in closing the inter-particle channels by small particles, leading to cake permeability loss.

Another effect of applying shear forces for membrane permeability control is the release of extracellular polymeric substances (EPS) from activated sludge flocs, either in the form of colloidal matter or soluble microbial products (SMP). This effect originates from both direct floc and cell disruption leading to foulant liberation, and the increased microbial EPS production in an effort to remain flocculated.

Finally, a very important consequence of applying shear forces to activated sludge flocs is the often-quoted loss of microbial activity in terms of biodegradation, progressing along with deflocculation process. It is caused by destroying the intimate, short-distance relationships between microorganisms inhabiting the activated sludge floc, which are often engaged in food exchange links. This leads to the separation of microcolonies, e.g. of nitrifiers, resulting in poor substrate transfer and, in the large scale, to the decrease of the overall nitrification rate in the bioreactor.

All these effects lead to the fact that mixed liquor activated sludge from MBR reactors exhibits much lower filterability than that from conventional activated sludge systems (up to three orders of magnitude!), which stands in direct opposition to the desired effect. The importance of floc size and strength can be illustrated by the beneficial effect of the so-called flux enhancers—a class of chemicals developed with a purpose of flocculating the shredded MBR biomass and binding the SMP from sludge mixed liquor so that higher membranes fluxes could be sustained. Although flux enhancers are moderately effective in improving MBR hydraulic performance, they act on the effect, rather than the cause of the problems. They do bind some deflocculated materials into denser aggregated, which has a positive effect on hydraulic performance of the membranes, but they do nothing to decrease the dead fraction of MLSS, improve sludge dewatering, correct the microbial community composition of sludge or decrease the aeration costs, which are all the consequences of membrane presence in the activated sludge system. Therefore, the integration of knowledge about the microbiological basis of the wastewater treatment process with knowledge of filtration of compressible biological materials creates unique possibilities for process optimization, far exceeding those resulting from independent optimization of biology and filtration. Understanding and acknowledging the unique biological and physico-chemical properties of activated sludge mixed liquor can turn the apparent process difficulties into unique opportunities for innovation in wastewater treatment industry.

Hence, an improved an improved process and device for treatment of waste water would be advantageous.

OBJECT OF THE INVENTION

An object of the present invention is to provide an alternative to the prior art.

In particular, it may be seen as a further object of the present invention to provide a process and a device that solves the above mentioned problems of the prior art.

SUMMARY OF THE INVENTION

Thus, the above described object and several other objects are intended to be obtained in a first aspect of the invention by providing a process for selectively removal of deflocculated sludge below a pre-selected size from a sludge mixed liquor, the process preferably comprising:
  a first separation in which at least a fraction of said sludge mixed liquor is separated into fractions including:
    a first fraction containing sludge flocs, and
    a second fraction containing deflocculated sludge;
  a second separation separating at least a fraction of the second fraction into fractions including:
    a third fraction containing a less amount of, such as substantially no, deflocculated sludge, and
    a fourth fraction containing a higher amount, such as substantially all of the deflocculated sludge contained in the second fraction;
  wherein the process further comprising
  feeding the first fraction and the third fraction into said sludge mixed liquor.

The invention provides a "selective removal", since the first fraction contains sludge flocs and the third fraction contains substantially no deflocculated sludge, and such matter is substantially contained in the fourth fraction which is not introduced into the sludge mixed liquor, thereby forming a selectively removal of deflocculated sludge from the sludge mixed liquor, while allowing sludge mixed liquor "freed" at least to some degree from deflocculated sludge to enter into the sludge mixed liquor. This provides inter alia the effect of keeping the sludge mixed liquor active to provide an efficient treatment of waste water.

It is noted that although the description of the invention presented herein suggest that the fourth fraction is a stream, such as a liquid stream streaming out from the second separator, the fourth fraction may be a deposition of deflocculated flocs which is removed occasionally.

The proposed technology concept offers a way to limit membrane fouling, increase aeration efficiency, and improve process rates and microbial composition profile by biomass selection and its selective wasting. Separation of well-flocculated biomass and selective wastage of the deflocculated fraction and biomass debris offers a way to decouple sludge age from MLSS concertation and biomass wastage, and therefore engineer the biomass properties for improved process efficiency.

According to preferred embodiment of the invention, such embodiment may be viewed as comprising a primary separation followed by a secondary separation on the product of the first separation fashioned in order to remove matter still present in that fraction. In accordance with some preferred embodiments, particles removed are deflocculated sludge particles, originating from sludge itself when it's subjected to shear forces. The purpose of removing them may be to improve the quality of sludge inside the process tank (and gain process efficiency in aeration, dewatering etc), and not necessarily to improve the product water quality.

Thus, in accordance with some preferred embodiments, the quality is improved to improve efficiency of other unit operations, such as aeration, dewatering etc. Further, the operations according to some preferred embodiment of the invention may be decoupled from a full plant flow and recirculate sludge through the various components return it to process tank, not necessarily with an aim to "mind" the product water.

The selection of biomass can be achieved in a stand-alone device using a combination of physical principles to separate properly flocculated biomass fraction from inactive biomass debris. The proposed technology could be retrofitted to any MBR, regardless of its design, application space and geographical placement, and significantly improve its overall value. In the present context a number of terms are used in a manner being ordinary to a skilled person. Some of these words are elucidated below:

MBR is used as a abbreviation for Membrane BioReactors.

MLSS is used as an abbreviation for Mixed Liquor Suspended Solids

BOD is used as an abbreviation for Biochemical Oxygen Demand, which is the amount of oxygen needed by organisms to break down the organic material in wastewater.

PAO is used as an abbreviation for Phosphate Accumulating Organisms, which are bacteria responsible for biological removal of phosphorus from wastewater OPEX is used as an abbreviation for Operational Expenditure, which refers to costs of running a device or technology Activated sludge flocs is preferably used to mean microbial aggregates forming majority of activated sludge mixed liquor suspended solids. In addition Activated sludge flocs is also preferably used to mean bacterial aggregates constituting the settleable fraction of the activated sludge mixed liquor, made up by bacteria, protozoa and other particles held together (like glue) by extracellular polymeric substances produced by bacteria.

Activated sludge mixed liquor or in short Sludge mixed liquor is preferably used to mean mixture of activated sludge flocs and activated sludge supernatant present in a process tank or tanks of an installation performing wastewater treatment according to the activated sludge process. Accordingly, activated sludge mixed liquor is preferably a mixture of liquid, typically being water, and mass of biological flocs.

A first fraction containing sludge flocs is preferably used to reference a liquid from which some amounts, preferably substantial all, of deflocculated flocs have been removed.

A second fraction containing deflocculated sludge is preferably used to reference a liquid containing the deflocculated flocs removed to provide the first fraction.

Deflocculated flocs is preferably used to refer to the material resulting from a process of floc disruption into smaller fragments, or fine particles eroded from sludge flocs by shear forces Fine particles is preferably used to refer to the particles—which may include deflocculated flocs—being below a pre-defined size, such as below 15 micron, such as 10 micron, preferably 5 micron.

Deflocculated sludge is preferably used to reference deflocculated cells, floc debris and the like, which may have a negative effect on the operation of biological wastewater treatment processes, MBRs in particular Activated sludge supernatant is preferably used to mean the top fraction of the activated sludge mixed liquor remaining after settling of the activated sludge flocs, containing the unsettleable particles and few activated sludge flocs. The settling is typically and preferably carried out until a top fraction of activated sludge supernatant is distinct, such as visually distinct. Accordingly, Activated sludge supernatant is preferably the water phase resulting from settling, centrifugation or in general separation of activated sludge mixed liquor, by separating out e.g. flocs and/or other solid elements contained in the activated sludge mixed liquor. The separation provides an activated sludge mixed liquor bottom fraction, which can be characterised as having a higher concentration of flocs than the unseparated active sludge mixed liquor.

Treating waste water is preferably used to indicate a process in which waste water is subjected to a biological treatment, such as an aerobic treatment.

Waste water is preferably used to indicate water containing organic materials and nutrients rendering it unfit for use, consumption or discharge, and therefore requiring treatment.

The invention relates in a second aspect to device for selectively removal of deflocculated sludge below a preselected size from a sludge mixed liquor, the device preferably comprising:
  a tank adapted to contain sludge mixed liquor
  a first separator fluidic connected to the interior of tank for receiving said sludge mixed liquor from the tank and being configured for separating the received mixed liquor into fractions including:
    a first fraction containing sludge flocs, and
    a second fraction containing deflocculated sludge;
  a second separator fluidic connected with first separator for receiving at least a fraction of the second fraction and being configured for separating said second fraction into fractions including:
    a third fraction containing a less amount of, such as substantially no, deflocculated sludge, and
    a fourth fraction containing a higher amount of deflocculated sludge, such as substantially all the deflocculated sludge contained in the second fraction;
  wherein
  the first separator is fluidic connected to the tank to feed the first fraction into the tank, and
  the second separator is fluidic connected to the tank to feed the third fraction into said tank.

The first and second aspect of the present invention may be combined. These and other aspects of the invention will be apparent from and elucidated with reference to the embodiments described hereinafter as well as in the claims.

BRIEF DESCRIPTION OF THE FIGURES

The present invention and in particular preferred embodiments thereof will now be described in more detail with reference to the accompanying figures. The FIGS. show ways of implementing the present invention and are not to be construed as being limiting to other possible embodiments falling within the scope of the attached claim set.

FIG. 1 also illustrate on a conceptual level an embodiments of physical implementations (devices) of that process;

FIG. 1 also illustrate on a conceptual level an embodiments of physical implementations (devices) of that process;

DETAILED DESCRIPTION OF AN EMBODIMENT

Figure 1:
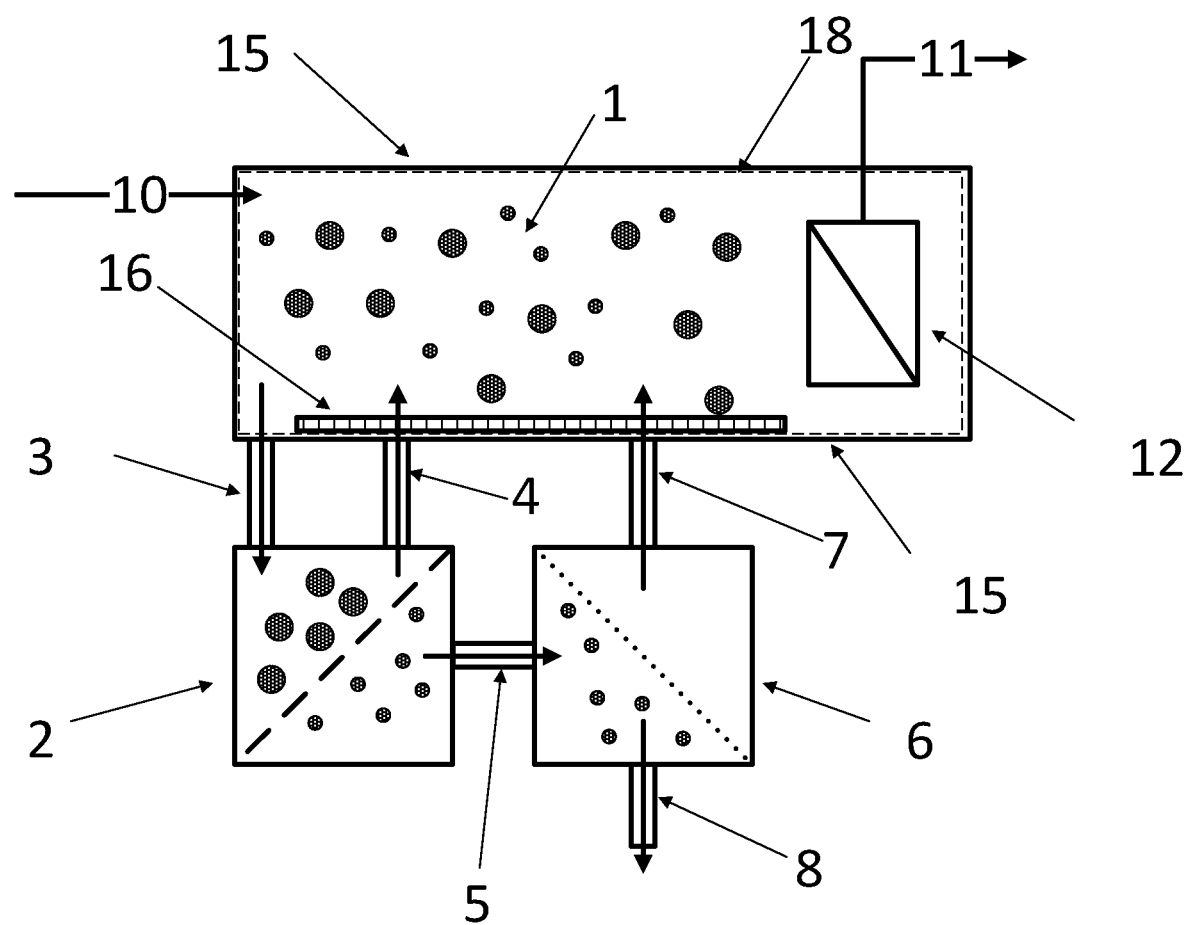
FIG. 1 schematically illustrates a preferred embodiment of a process according to the invention.

The present invention aims inter alia at providing technology capable of addressing some, most or even all the issues related to the presence of a membrane in the biological sludge system and adding new degrees of freedom to process control.

Once concept of the invention, is to selectively remove the deflocculated material from MBR mixed liquor by separation of small particles (deflocculated cells, floc debris) from large particles (flocs and floc aggregates), and further solid/liquid separation of that fraction and ultimate removal of reject matter from the system. In addition, selective wasting of deflocculated material rather than general mixed liquor is seen to create a new degree of freedom in system control, by decoupling sludge age from MLSS concentration and sludge wasting. This extra control handle would be especially valuable to MBR systems run with short sludge age and low MLSS concentrations, enabling higher abundances of slow-growing microorganisms to thrive in such systems regardless of the apparently short sludge age or low MLSS concentration.

Removal of deflocculated matter from MBR mixed liquor may not only combat membrane fouling better than flux enhancers (no 'sticky' matter to potentially plug membrane pores will be introduced into the system), but will assure comprehensive optimization of many aspects of MBR functioning:
  improve biomass cake formation characteristics, leading to higher fluxes and lower pressure drops on the membrane
  decrease the demand for membrane air sparging or crossflow
  decrease the dead fraction of MLSS, improving the process rates and system capacity with respect to BOD removal and potentially opening a way to design more compact systems
  improve aeration efficiency by increasing the alpha factor for oxygen transfer
  decouple the true sludge age from sludge wasting and MLSS concentration, leading to improving the biomass composition by enabling slow growing organisms like nitrifiers, denitrifiers and PAO to build up to significantly higher abundances (especially important to systems run with short sludge age)

Given that the dead fraction of MBR mixed liquor is often around 20%, and that anti-fouling costs in MBRs can reach up to 50% of their OPEX, at least a 20-30% reduction of the overall OPEX can be expected with the proposed technology.

The selective removal of deflocculated matter can be achieved in a compact, stand-alone sub-system performing a two-step procedure. In the first step, the mixed liquor would be separated into large and small particles e.g. by gravity-based or filter-based approaches. The 'heavy' fraction, containing well-flocculated sludge, would then be returned to the process tank, or membrane tank if present. In the second step, the 'light' fraction containing the deflocculated material would be subjected to more rigorous solid/liquid separation, where water would be returned to the process and solids would constitute the waste sludge. This way the waste sludge of the MBR system would by partly or entirely made up of the unproductive sludge fraction, helping to realize the abovementioned advantages.

Figure 2:
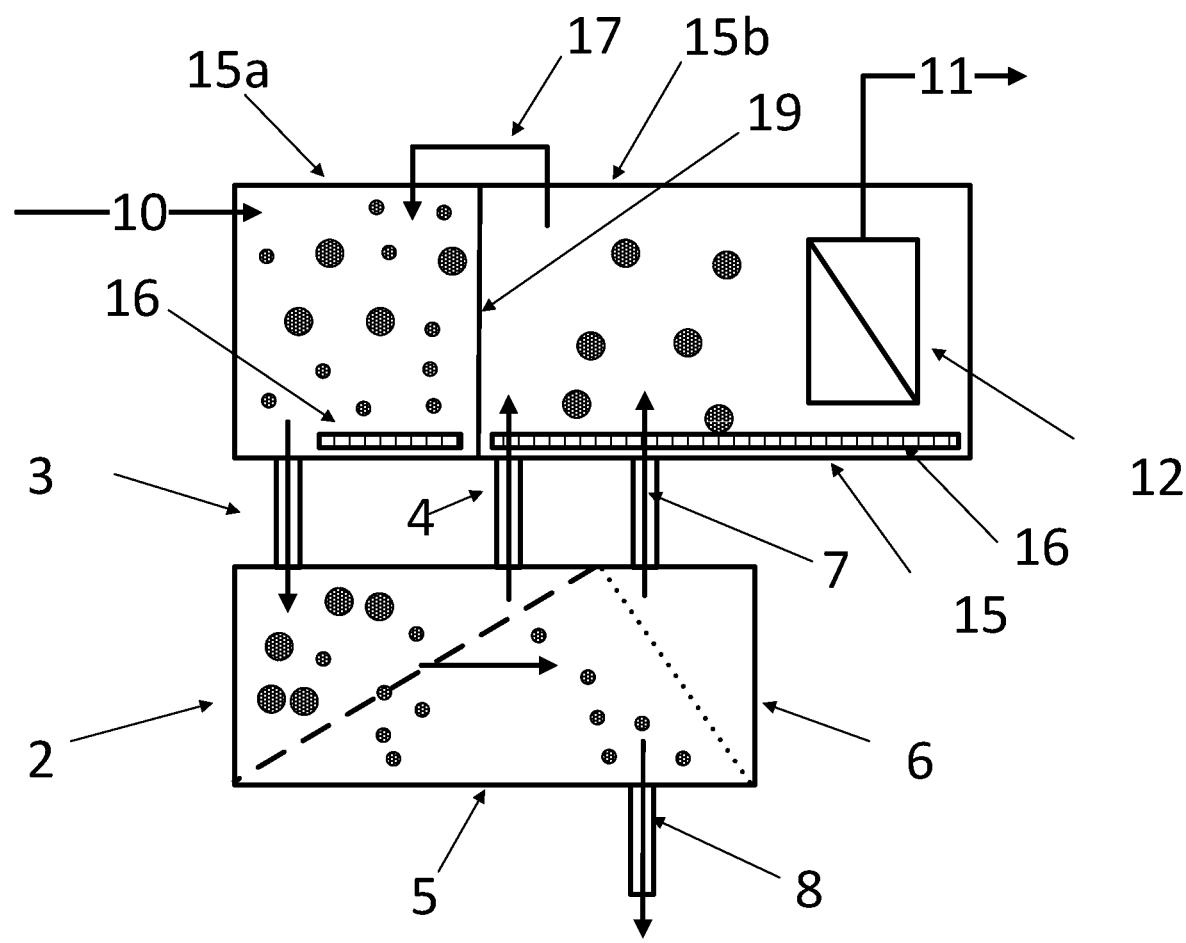
FIG. 2 schematically illustrates a preferred embodiment of a process according to the invention.

There is a number of possible specific approaches to separating the large sludge aggregates from small debris, such as those included high-rate clarification, cyclone centrifugation and cross-flow assisted coarse filtration. All these approaches have been shown to work in our experiments and carry out the required functions In the following, various aspects and embodiments of the invention will be presented with reference to the accompanying figures. FIGS. 1 and 2 schematically illustrate preferred embodiments of a process according to the invention, and illustrate also on a conceptual level embodiments of physical implementations (devices) of the process according to preferred embodiments.

FIG. 1 illustrates schematically a process for selectively removal of deflocculated sludge below a pre-selected size from a sludge mixed liquor 1. As illustrated, the sludge mixed liquor is contained in a tank 15 and waste water 10 is fed into the tank 15. Since the tank 15 contains sludge mixed liquor 1, the waste water 10 will undergo a treatment, preferably being an aerobic bacterial treatment in the tank 15.

As illustrated in FIGS. 1 and 2, the process comprises a first separation 2 wherein at least a fraction 3 of the sludge mixed liquor 1 is taken from the tank 15 and is separated into fractions including a first fraction 4 containing sludge flocs, and a second fraction 5 containing deflocculated sludge. In FIGS. 1 and 2, larger circles are used to illustrated sludge flocs and smaller circles are used to illustrate deflocculated sludge and fine particles. It is noted that it is considered with the scope of the invention that the fraction of the sludge mixed liquor is separated into further fractions than the first and the second fraction 4, 5.

The separation in FIG. 1 is illustrated as a process that takes place outside the tank where the fraction of sludge mixed liquor is fed into a cavity divided by a screen (illustrated by a diagonal, dotted line) allowing deflocculated sludge and fine particles to pass through while arresting sludge flocs and producing the first fraction 4 and the second fraction 5.

However, the process can also be implemented by arranging the first separation device 2 inside the tank 15, and can use other physical principles than screening, such as gravity separation and forced gravity separation (centrifugation, cyclones etc.)

The process also comprise a second separation 6 separating at least a fraction of the second fraction 5 into fractions including a third fraction 7 containing a less amount of, such as substantially no, deflocculated sludge, and a fourth fraction 8 containing a higher amount, such as substantially all of the deflocculated sludge contained in the second fraction. Also this second separation 6 may be—alternatively to arranging the second separator 6 outside the tank 15—performed inside the tank 15 by arranging the second separator 6 inside the tank 15. Separators 2 and 6 can also be integrated into a single device performing both separation functions.

In the embodiments shown in FIGS. 1 and 2 all of the second fraction 5 is separated, but the invention is not limited to this, since a fraction of the second fraction may be used for other purposes than separation if desired.

The process further comprises feeding the first fraction 4 and the third fraction 7 into said sludge mixed liquor 1.

Hereby, the "selective nature" of the invention can be realised, since the first fraction 4 contains sludge flocs and the third fraction 7 contains substantially no deflocculated slugde, and such matter is substantially contained in the fourth fraction 8 which is not introduced into the sludge mixed liquor, the separations 2, 6 form a selectively removal of deflocculated sludge from the sludge mixed liquor. Thus, the first fraction 4 may be seen as containing improved quality sludge and the third fraction may be seen as containing water, which may be termed clarified supernatant.

It is noted that the fourth fraction 8 may be a liquid fraction containing the deflocculated flocs or may be a deposition of deflocculated flocs inside the second separator 6 which deposition is removed occasionally, thereby removed from the separator 6.

As illustrated, the process further comprise filtering the mixed liquor 1 contained inside the tank 15. Such a filtering is designed to provide a filtrate 11 containing substantial no sludge flocs. In preferred embodiments, the filtering is preferably a membrane filtration.

Different choices for providing the first separation exist, and it is envisaged that a first separation 2 selected from one or more of:
- a gravity-based separation in which the first fraction is provided by settling or sedimentation,
- a cyclone based separation, and/or
- a cross flow filter with opening selected in the range between 5-30 micron provides a useful separation.

The gravity-based separation may be provided by a using a container of sufficient volumetric size to allow settling or sedimentation of matter having a density making the matter sink towards the bottom—that is typically sludge mixed liquor, and/or sludge flocs—and arranging an outlet at the bottom for extracting the first fraction 4 and an outlet at an upper end for extracting second fraction 5 deflocculated flocs and fine particles.

The cyclone based separation may be provided by an ordinary hydro-cyclone where the first fraction 4 is taken out at the lower end of the hydro-cyclone and the second fraction 5 is taken out at the upper end of the hydro-cyclone at the centre of the hydro-cyclone.

The cross flow filter separation may be provided by leading the fraction of sludge mixed liquor passed a filter element in a flow direction being parallel to the surface of the filter element and providing a positive pressure difference across the filter element to provide a flow though the filter element.

The different types for the first separation 2 mentioned above may also be combined, such as arranged in series.

Different choices for providing the second separation 6 exist, and it is envisaged that a second separation 6 selected from one or more of:
- a cake filtration, where a filter cake is provided by sludge flocs,
- a sock filter filtration,
- a membrane filter,
- a granular media filter, such as sand filter,
- a mesh type band filter or disc filter.

The cake filtration option is found to be particular useful separating deflocculated flocs out from the second fraction 5. Such a cake filtration is based on formation of a filtration cake on a filtration cake support, such as a screen with opening, wherein the filtration cake is made by depositing sludge flocs. While such flocs may be harvested from the tank 15, it is found to be advantageous to use the first fraction 4 as a source of sludge flocs, since deflocculated flocs are substantially removed from this fraction. When the filtration cake is formed, the sludge flocs—typically be a fluid flow—are directed towards the surface of filtration cake support. A flow is at the same time established through the filtration cake support, whereby sludge flocs deposit on the surface of the filtration cake support. The filtering characteristics can be designed by the thickness of the filtration cake and by compressing the filtration cake deposited on the filtration cake support; such a compression can suitably be provided by increasing the pressure across the deposited sludge flocs for a pre-defined time period so as to compress the filtration cake to obtain a more dense structure. After the formation of the filtration cake, the filtration cake can be used as filter to separate the second fraction 5 into the third fraction 7 and the fourth fraction 8 would remain inside the filtration cake and be removed together with it.

A sock filtering can be embodied by an ordinary sock filter into which the second fraction is fed. The filtering is typically provided by an outside-in filtration where the second fraction is filtered through filter material of the sock so as to provide the third fraction at the inside of the sock—or reversed in an inside-out configuration.

Membrane filter, granular media filter, such as sand filter, a mesh type band filter or disc filter, may also be embodied by ordinary filters of the named type. The different types for the second separation 6 mentioned above may also be combined, such as arranged in series.

In a specific preferred embodiment of the process the first separation 2 separates the at least a fraction 3 of said sludge mixed liquor 1 into two fractions: the first fraction 4 containing sludge flocs, and the second fraction 5 containing deflocculated sludge. Thereby (with reference to FIG. 1) all the sludge mixed liquor 1 that is fed from the tank 15 into the first separator 2 is separated into first and second fraction 4, 5.

In a specific preferred embodiment of the process the second separation 6 separates the second fraction 5 into two fractions: the third fraction 7, and the fourth fraction 8. Thereby (with reference to FIG. 1) all of the second fraction 5 is separated into third and fourth fraction 7, 8.

In a process according to the present invention, the pre-selected size for the deflocculated sludge is below 15 micron, such as below 10 micron, preferably below 5 micron. This means that particles having size smaller than this is considered to be finer particles. By size is typically meant that the particles can pass through a porous material having a pores size up to 15 micron, such as 10 micron, preferably 5 micron. However, size may not be the only parameter useful to define first and second fractions, as speed of settling could be another one.

As illustrated in FIGS. 1 and 2. gas sparging 16 introducing gas, such as oxygen or atmospheric air into said sludge mixed liquor 1 may be applied. Thereby, e.g. an aerobic bacterial treatment of waster water in the sludge mixed liquor can have oxygen supplied to avoid e.g. lack of oxygen. Further, the gas sparging 16 when arranged as in FIG. 1 e.g. at the bottom of the tank 15 may provide a stirring in the sludge mixed liquor in the tank 15 thereby at least assisting in providing a more efficient treatment of the waste water since the stirring reduces the risk of creating zones with little or no matter exchange (dead zones). Further, other stirring devices, such as mechanical stirrers, may be arranged in the tank.

Reference is made to FIG. 2 illustrating a specific preferred embodiment. In the illustrated embodiment, the sludge mixed liquor containing deflocculated flocs is contained in a first tank 15a. The first tank 15a receives waste water. The first and the second fractions 4, 5 are provided by separating sludge mixed liquor extracted from the first tank 15a. And, the first fraction 4 and the third fraction 7 are fed into a second tank 15b thereby introducing sludge mixed liquor from which deflocculated matter has/have been at least partly removed into the second tank 15b. Thus, in the embodiment shown in FIG. 2, the tank comprises two separate tanks 15a, 15b which are separate in the sense that matter can not flow directly from one of the tanks 15a (e.g.) to other tank 15b without flowing through the connections illustrated in FIG. 2 (e.g. through separators or connection 17). This also implies that the two tanks does not necessarily share a common wall as illustrated in FIG. 2 but may be two standalone tanks.

Since in the embodiment shown in FIG. 2 the first fraction is fed into another tank (tank 15b) than from where the sludge mixed liquor 3 is taken it is beneficial to feed at least a fraction of the sludge mixed liquor contained in the second tank 15b into the first tank 15a, since the fraction taken from the second tank 15b typically has a higher content of sludge flocs than the sludge mixed liquor in the first tank 15a. Such recirculation may also minimize the MLSS concentration increase in tank 15B.

Further, in FIG. 2, the first and the second separator 2 and 6 are shown as being built into a single unit, which unit may also be applied in connection with the embodiment shown in FIG. 1.

Reference is made to FIG. 1 illustrating an embodiment in which the sludge mixed liquor is contained in a tank 15. Compared to the embodiment of FIG. 2, the tank 15 in FIG. 1 is a single tank containing the sludge mixed liquor. The first and the second fractions 4, 5 are provided by separating sludge mixed liquor extracted from the tank 15 (by use of the first and the second separators 2, 6), and the first fraction 4 and the third fraction (7) are fed into said tank 15. Thereby selectively removal of deflocculated sludge from the sludge mixed liquor 1 contained in the tank 15 is provided.

The filtering 12 of the sludge mixed liquor 1 to provide a filtrate 11 containing a less amount of such as substantially no sludge flocs, filters:
the sludge mixed liquor contained in the second tank 15b in embodiments where the tank 15 is divided into two or more tanks 15a, 15b. If more than two tanks 15 are provided, the filtering is provided in the most downstream tank;
the sludge mixed liquor contained in the tank 15 in embodiments wherein the tank is non-divided (as also referred to herein as a non-divided void).

It may in general be preferred to perform the filtering at a position being most downstream to the position at which waste water is introduced.

The filtering 12 is preferably carried out by use of a microporous membrane filter, being is a microfiltration typically having a pores size of between 10 micron and 0.1 micron, or an ultrafiltration membrane typically having a pore size between 0.1 micron and 0.001 micron.

The fourth fraction 8 may contain biological material which may be of use e.g. as a fertilizer, a source for biogas production or it may be considered as of no use. Accordingly, the fourth fraction 8 may be disposed by being fed to a storage capacity, a biogas production facility, or may be dewatered and disposed of in general.

The waste water is in general considered be treated when in contact with the sludge mixed liquor and a process according to the invention may therefore be seen as waste water treatment process which provide said sludge mixed liquor.

Reference is in the following made to FIGS. 1 and 2 with purpose of disclosing further details as to a device for carrying out the process aspect of the invention.

FIG. 1 illustrates a device for selectively removal of deflocculated sludge below a pre-selected size from a sludge mixed liquor 1. The illustrated device comprising a tank 15 adapted to contain sludge mixed liquor 1, which typically means that the tank is made of a material being resistant to corrosion stemming from the material contained in the tank 15 and being fluid tight to avoid leakage from the tank 15. The tank may be made from plastic, metal, concrete or the like.

In the following, the wording "fluidic connected" is used in a couple of instances and is typically used inter alia to refer to a flow passage (such as inlet or outlet), a pipe, a tube and the like. One or more valves may be introduced to control the flow through the fluidic connection.

Further, configured for is used to reference inter alia the various devices disclosed herein.

The device has a first separator 2 fluidic connected to the interior of tank 15 for receiving said sludge mixed liquor 1 from the tank 15. In the embodiment of the FIG. 1, the fluidic connection is a pipe leading sludge mixed liquor 1 from the tank 15 to the first separator 2.

The first separator 2 being configured for separating the received mixed liquor into fractions including: a first fraction 4 containing sludge flocs, and a second fraction 5 containing deflocculated sludge.

The device also has a second separator 6 fluidic connected with first separator 2 for receiving at least a fraction of the second fraction 5. In the embodiment of FIG. 1, the fluidic connection is a pipe leading the second fraction 5 to the second separator 6. The second separator being configured for separating said second fraction 5 into fractions including a third fraction 7 containing a less amount of, such as substantially no, deflocculated sludge, and a fourth fraction 8 containing a higher amount of deflocculated sludge, such as substantially all the deflocculated sludge contained in the second fraction 5.

Further, the first separator 2 is fluidic connected to the tank 15 by a pipe to feed the first fraction 4 into the tank 15, and the second separator 6 is fluidic connected to the tank 15 by a pipe to feed the third fraction 7 into said tank 15.

Although the embodiment of FIG. 1 illustrates the first and second separator 2, 6 as separators being arranged outside the tank 15 and connected through pipe, one or both separators 2, 6 may be arranged inside tank 16. In such cases, inflow to the first separator may be an inlet and the outflow from the first separator 2 and the outflow from the second separator 6 may be outlets both being flow passages opening into the interior of the tank 15. Furthermore, separators 2 and 6 may be integrated into a single device performing both separation functions.

As illustrated in FIG. 1 and FIG. 2, the device further comprises a filter 12 arranged to filter said mixed liquor 1 contained in the tank 15 to provide a filtrate 11 containing substantial no sludge flocs. The filter 12 is typically a membrane filter and the filter 15 being preferably arranged inside the tank 15. However, other types of filters may be used and further the filter 12 may be arranged outside the tank in which case a fluidic connection is provided for feeding sludge mixed liquor to the filter 12 and for returning the filtered sludge mixed liquor to the tank 15.

The first separator 2 may be is selected from one of (or a combination thereof):
  a gravity separator in which the first fraction is provided by settling or sedimentation,
  a cyclone separator, and/or
  a cross flow filter with openings selected in the range between 5-30 micron as also disclosed in connection with the process aspect of the invention (see above).

The second separator 6 may be selected from one of (or a combination thereof):
  a cake filter, where a filter cake is provided by sludge flocs being deposited on a filtration cake support being a porous member allowing liquid to flow through and arresting deflocculated sludge,
  a sock filter filtration,
  a membrane filter,
  a granular media filter, such as sand filter,
  a mesh type band filter or disc filter
as also disclosed in connection with the process aspect of the invention (see above).

The filtration cake support is typically defined by a material having penetrations, such as a net with meshes, wherein the pore diameter of the penetrations is preferably in the range of 1 micron to 100 micron. The filtration cake support is preferably a net made from metal, such as stainless steel, or polymers.

As disclosed herein, the first separator 2 may be configured for separating the received sludge mixed liquor 1 into two fractions the first fraction 4 containing sludge flocs, and the second fraction 5 containing deflocculated sludge. This means that all of the slugde mixed liquor 1 received from the tank is separated in such two fractions only. Similarly, the second separator 6 may be configured for separating the second fraction 5 into two fractions only, namely the third fraction 7, and the fourth fraction 8.

As illustrated in FIG. 1, the device may further comprise a gas sparger 16 for introducing gas, such as oxygen or atmospheric air into the tank 15 for supplying said sludge mixed liquor 1 with oxygen. The gas sparger 16 is typically a device adapted to introduce gas bubbles, such as oxygen or atmospheric air bubbles into the sludge mixed liquor 1. The gas sparger 16 may be embodied as a devices comprising a plurality of small openings through which gas may leave the gas sparger 16 and enter into the slugde mixed liquor 1. The size of the small openings are selected according to a desired size of the bubbles.

As will be disclosed below in connection with FIG. 2, the tank may comprise two separate tanks 15 and 15b and in such embodiments, an air sparger 16 as disclosed in connection with FIG. 1 may be arranged inside and at the bottom of each of the tanks 15a and 15b to introduce gas, oxygen and/or atmospheric air into the tanks, preferably as gas bubbles.

Similarly, a stirrer may be arranged in the tank 15 or in each of the tanks 15a and 15b.

Reference is made to FIG. 2 in which the tank 15 is shown as two separate tanks 15a and 15b. In the embodiment of FIG. 2, the two tanks 15a and 15b are provided by a dividing wall 19 dividing a tank into two tanks. However, the two tanks 15a and 15b may be provided by separate tanks as also disclosed above. Thus, in the embodiment of FIG. 2, the tank 15 comprising a first tank 15a and a second tank (15b). The first separator 2 is fluidic connected by a pipe to the first tank 15a to receive sludge mixed liquor from the first tank 15a.

Thereby the first and the second fractions (4, 5) are provided by separating sludge mixed liquor extracted from the first tank 15a, only.

The first separator 2 is fluidic connected by a pipe to the second tank 15 to feed the first fraction 4 into the second tank 15b, and to the second separator 6 to feed the second fraction into the second separator 6. In the embodiment shown in FIG. 2, the first and the second separator are built into a single unit, so that the second fraction 5 flow directly into the second separator 6 as schematically illustrated in FIG. 2. However, the first and the second separators 2, 6 may be embodied as illustrated in FIG. 1.

The second separator 6 is fluidic connected by a pipe to the second tank 15b to feed the third fraction 7 into the second tank 15b.

Thus, by the arrangement of the first and the second separator in a configuration where sludge mixed liquor 1 is taken from the first tank 15a, freed from deflocculated flocs and introduced into the second tank 15b, the quality of the sludge mixed liquor 1 is improved, which improved sludge mixed liquor is introduced into the second tank 15b. The content of the second tank 15b is furthermore filtered by the filter 12 e.g. to extract the filtrate, i.e. the effluent of the MBR system.

To make, further, use of improved sludge mixed liquor, the second tank 15b is fluidic connected, by a pipe for return of sludge mixed liquor 17 to the first tank 15a in order to feed at least a fraction of the sludge mixed liquor contained in the second tank 15b to the first tank 15a. Due to inter alia the filtering by filter 12, the fraction of sludge mixed liquor returned to the first tank typically has a higher content of sludge flocs compared to the content of sludge flocs in the first tank 15a.

In the embodiment of FIG. 1, the tank comprising a non-divided void 18, in the meaning that the first and the third fraction 4, 7 is delivered to the same void as from where the first fraction 3 is received from. This is accomplished by the the first separator 2 is fluidic connected by a pipe to the non-divided void 18 to receive sludge mixed liquor from the said non-divided void 18, so that the first and the second fractions 4, 5 are provided by separating sludge mixed liquor extracted from non-divided void 18.

The first separator 2 is also fluidic connected by a pipe to the non-divided void 18 to feed the first fraction 4 into the said non-divided void 18 and fluidic connected to the second separator 6 to feed the second fraction into the second separator 6 (as noted above, the first and the second separators 2, 6 are built in to a single unit in FIG. 2, but may be two separate units as illustrated in FIG. 1).

Further the second separator 6 is fluidic connected by a pipe to the non-divided void 18 to feed the third fraction 7 into the non-divided void 18.

It is noted that also in this embodiment, one or both separators 2, 6 may be arranged inside the tank 15, that is inside the non-divided void 18.

The filter 12 is typically arranged so that it filters:
the sludge mixed liquor contained in the second tank 15b in embodiments having two or more tanks as illustrated in FIG. 2;
the sludge mixed liquor contained in the non-divided void 18 in embodiments having such a non-divided void 18 as illustrated in FIG. 1

Again, the filter 12 may be arranged inside the tank 15 or outside the tank, and be fluidic connected to the relevant region of the tank 15 by suitable fluid connection such as pipes.

A suitable filter 12 is found to be a microporous membrane filter, such as a microfiltration typically having a pores size of between 10 micron and 0.1 micron, and/or an ultrafiltration membrane typically having a pore size between 0.1 micron and 0.001 micron.

As illustrated in FIG. 2, the second separator 6 is fluidic connected by an outlet pipe to feed the fourth fraction 8 out from the second separator 2. The outlet may be arranged to fed the fourth fraction into a storage capacity, a biogas production facility, or is dewatered and disposed of.

Further, the device as illustrated in FIG. 2 comprising an inlet to the tank 15 for feeding waste water into said tank 15.

As disclosed herein a number of fractions, generally referenced below as fluid fractions, are produced. Although the process may be embodied as a batch process, it is generally preferred to operate the process as a continuous process in which waste water is continuously delivered to the tank 15. The fluid streams are selected so that:

Waste water infeed 10=Filtrate 11+Fourth Stream 8

Stream 3=First Stream 4+Third Stream 7+Fourth Stream 8

However, since the fluid flow pattern inside the tank and in the separators are difficult to estimate precisely it may be necessary to project a running-in-phase where valve and pump settings are tuned to provide the desired result. This may even be necessary during normal operation of the process and device since the waste water may change composition on a regular basis calling for a different setting of the various control devices. In general, the device according to this invention takes over the function of wasting sludge from the system, so the speed of running the separators, and the resulting speed of removing solids with fraction/stream 8 needs to be adjusted to sludge production rate of the system (MLSS increase rate).

Pumps and/or valves are typically provided in devices according to the invention to move the fluid around and in between the various components of the device.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED 1 sludge mixed liquor
2 Separating/separator
3 Fraction of sludge mixed liquor
4 First fraction containing flocculated sludge
5 Second fraction containing deflocculated sludge
6 Second separation
7 Third fraction
8 Fourth fraction
10 Waste water 11 Filtrate
12 Filtering/Filter
16 Tank (MBR)
16 Gas sparger
17 Return sludge mixed liquor
18 Non-divided void
19 Dividing wall

The invention claimed is:

1. A process for selective removal of deflocculated sludge below a pre-selected size from a sludge mixed liquor, the process comprising:
a first separation separating at least a fraction of said sludge mixed liquor into fractions comprising:
a first fraction comprising sludge flocs, and
a second fraction comprising deflocculated sludge;
wherein the first and the second fractions are provided by separating said sludge mixed liquor extracted from a first tank;
a second separation separating at least a fraction of the second fraction into fractions comprising:
a third fraction comprising a lower amount of deflocculated sludge, and
a fourth fraction comprising a higher amount of the deflocculated sludge contained in the second fraction;
feeding the first fraction and the third fraction into a second tank:
wherein the process further comprises
feeding the first fraction and the third fraction contained in the second tank into said sludge mixed liquor in the first tank;
the combination of the first fraction and the third fraction in the second tank having a higher content of sludge flocs than said sludge mixed liquor in the first tank.

2. The process according to claim 1, wherein the process further comprises:
filtering mixed liquor in the second tank to provide a filtrate comprising substantially no sludge flocs.

3. The process according to claim 1, wherein the first separation is selected from one or more or a combination of:
a gravity-based separation in which the first fraction is provided by settling or sedimentation,
a cyclone based separation, and/or
a cross flow filter with openings selected in the range between 5-30 micron.

4. The process according to claim 1, wherein the second separation is selected from one or more of:
a cake filtration, wherein a filter cake is provided by sludge flocs,
a sock filter filtration,
a membrane filter,
a granular media filter,
a mesh type band filter or
a disc filter.

5. The process according to claim 1, wherein the separating of the at least a fraction of said sludge mixed liquor as the first separation is into two fractions:
the first fraction containing sludge flocs, and
the second fraction containing deflocculated sludge.

6. The process according to claim 1, wherein the separating of the second fraction as the second separation is into two fractions:
the third fraction, and
the fourth fraction.

7. The process according to claim 1, wherein said pre-selected size is 15 micron, 10 micron, or 5 micron.

8. The process according to claim 1, wherein the process further comprises gas sparging by introducing a gas or atmospheric air into said sludge mixed liquor.

9. The process according to claim 1, wherein the sludge mixed liquor is contained in the first tank, and wherein:
the first and the second fractions are provided by extracting and separating the sludge mixed liquor from the first tank,
the first fraction and the third fraction are fed into said first tank,
thereby selectively removing deflocculated sludge from the sludge mixed liquor contained in the first tank.

10. The process according to claim 1, wherein the process further comprises filtering sludge mixed liquor contained in the second tank to provide a filtrate containing a lower amount of sludge flocs.

11. The process according to claim 10, wherein the the filtering is carried out by a microporous membrane filter having a pore size of between 10 micron and 0.1 micron, or an ultrafiltration membrane having a pore size between 0.1 micron and 0.001 micron.

12. The process according to claim 1, wherein the fourth fraction is fed to a storage capacity, or a biogas production facility, or is dewatered and disposed of.

13. The process according to claim 1, further comprising treating waste water to provide said sludge mixed liquor.

14. A device for selective removal of deflocculated sludge below a pre-selected size from a sludge mixed liquor, the device comprising:
a first tank configured to contain a sludge mixed liquor;
a first separator fluidically connected to an interior of the first tank for receiving said sludge mixed liquor from the first tank and being configured for separating the received mixed liquor into fractions including:
a first fraction containing sludge flocs, and
a second fraction containing deflocculated sludge;
a second separator fluidically connected with the first separator for receiving at least a fraction of the second fraction and being configured for separating said second fraction into fractions including:
a third fraction comprising a lower amount of deflocculated sludge, and
a fourth fraction comprising a higher amount of deflocculated sludge contained in the second fraction;
a second tank configured to contain at least a fraction of the first fraction and at least a fraction of the third fraction;
wherein
the first separator is fluidically connected to the second tank to feed the first fraction into the second tank,
the second separator is fluidically connected to the second tank to feed the third fraction into said second tank, and
the second tank is fluidically connected to the first tank to feed at least a fraction of the sludge mixed liquor contained in the second tank to the first tank, said fraction of sludge mixed liquor having a higher content of sludge flocs than the content of sludge flocs in the first tank.

15. The device according to claim 14, wherein the device further comprises:
a filter configured to filter mixed liquor contained in the second tank to provide a filtrate containing substantially no sludge flocs.

16. The device according to claim 14, wherein the first separator is selected from one of:
a gravity separator in which the first fraction is provided by settling or sedimentation, a cyclone separator, and/or a cross flow filter with openings selected in the range between 5-30 micron.

17. The device according to claim 14, wherein the second separator is selected from one of:

a cake filter, wherein the cake filter is provided by sludge flocs being deposited on a filtration cake support being a porous member allowing liquid to flow through and arresting deflocculated sludge, a sock filter filtration, a membrane filter, a granular media filter, a mesh type band filter or a disc filter.

18. The device according to claim 14, wherein the first separator is configured to separate the received sludge mixed liquor into two fractions:

the first fraction comprising sludge flocs, and the second fraction comprising deflocculated sludge.

19. The device according to claim 14, wherein the second separator is configured to separate the second fraction into two fractions:

the third fraction, and the fourth fraction.

20. The device according to claim 14, wherein said pre-selected size is 15 micron, 10 micron, or 5 micron.

21. The device according to claim 14, wherein the device further comprises a gas sparer for introducing a gas or atmospheric air into the first tank so as to supply said sludge mixed liquor with said gas or atmospheric air.

22. The device according to claim 14, wherein a filter filters:

sludge mixed liquor contained in the second tank.

23. The device according to claim 22, wherein the filter is a microporous membrane filter having a pores size of between 10 micron and 0.1 micron and/or an ultrafiltration membrane having a pore size between 0.1 micron and 0.001 micron.

24. The device according to claim 14, wherein the second separator is fluidically connected to feed the fourth fraction into a storage capacity, or a biogas production facility, or is dewatered and disposed of.

25. The device according to claim 14, further comprising an inlet to the first tank for feeding waste water into said first tank.

* * * * *